(No Model.)
J. MILLER.
FEED WATER HEATER AND PURIFIER.
No. 385,769. Patented July 10, 1888.
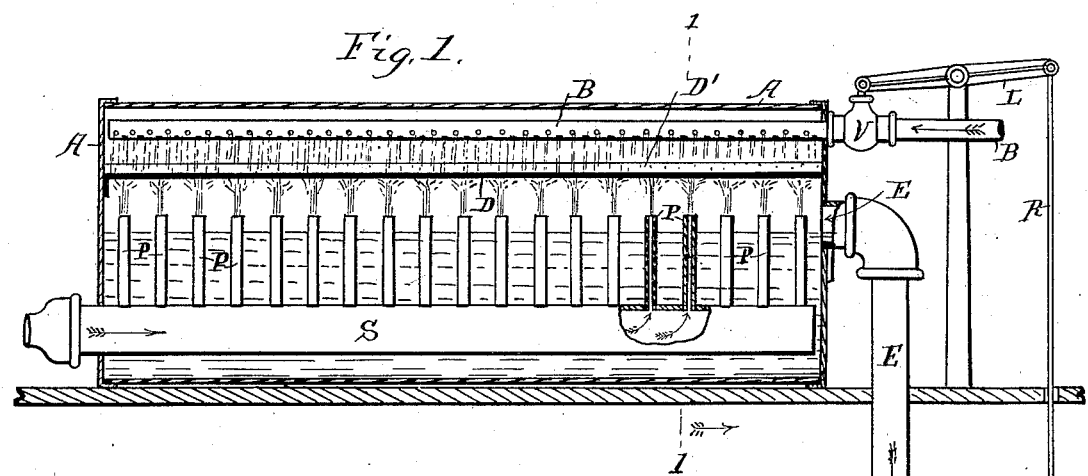
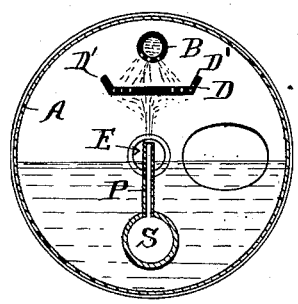
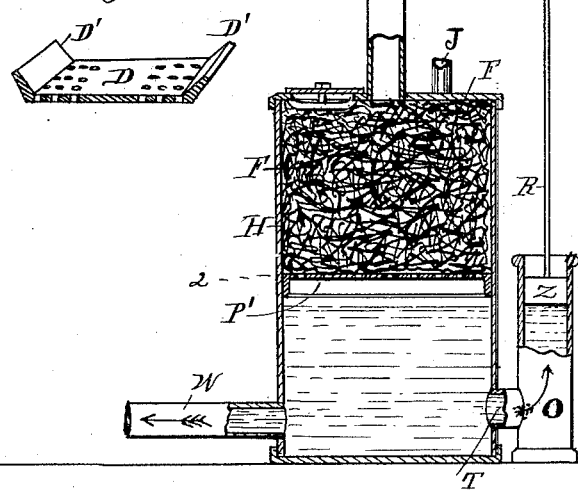
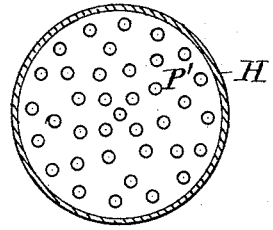
Witnesses,
Thos. H. Hutchins,
Wm. J. Hutchins.
Inventor,
James Miller.

UNITED STATES PATENT OFFICE.

JAMES MILLER, OF JOLIET, ILLINOIS.

FEED-WATER HEATER AND PURIFIER.

SPECIFICATION forming part of Letters Patent No. 385,769, dated July 10, 1888.

Application filed February 6, 1888. Serial No. 263,165. (No model.)

*To all whom it may concern:*

Be it known that I, JAMES MILLER, a citizen of the United States of America, residing at Joliet, in the county of Will and State of Illinois, have invented certain new and useful Improvements in Feed-Water Heaters and Purifiers, of which the following is a specification, reference being had therein to the accompanying drawings.

This invention relates to certain improvements in a feed-water heater and purifier for heating and purifying the feed-water for steam-boilers, and is particularly adapted for separating the lime deposit, &c., from the feed-water, in order that the water fed to a boiler will be perfectly free from all substances that tend to crust or coat the interior of steam-boilers, the construction and operation of which are fully set forth and explained in the following specification and claims, reference being had to the accompanying drawings and the letters and figures thereon, which form a part of this specification, in which—

Figure 1 is a longitudinal vertical sectional elevation of the apparatus. Fig. 2 is a cross-sectional view of the heater on line 1 of Fig. 1, looking as indicated by the arrow. Fig. 3 is a perspective view of a section of the perforated heating-plate of the heater; and Fig. 4 is a cross-sectional view of the purifying filter on line 2 of Fig. 1, looking down upon its perforated partition.

Referring to the drawings, A represents a cylindrical body constructed from plates of iron or steel, with suitable heads, and is arranged in a horizontal position on a second floor or elevation, and with its connected parts form the water-heater.

H represents a cylindrical body similarly constructed, and is arranged on the floor in a vertical position below body A, and with its connected parts and deposit forms the water-purifying filter.

S is a steam-pipe arranged longitudinally in the lower part of body A, as shown, and is connected with the exhaust-pipe of a steam-engine, and the exhaust-steam from the connected engine enters said pipe S.

P indicates a series of short pipes arranged vertically along and opening into the upper part of pipe S and of quite small diameter, and form exhausts for pipe S'.

D is a plate arranged longitudinally in body A centrally above exhaust-pipes P, and has a series of perforations along each side next the upturned side parts, D', leaving a central unperforated part, as shown particularly in Fig. 3.

B is a cold-water-supply pipe arranged longitudinally and centrally above plate D, and is perforated along its lower side in such manner as to discharge a water-spray upon plate D, and is also connected with an outer supply-pipe and a valve, V, for cutting off its supply.

E is a water-pipe connecting the water-heater with the water-purifying filter for conducting the water and steam after they have undergone the action of the heater to the filtering-purifier, and is connected with body A at one end thereof in such manner that its center is slightly below the upper end of the exhaust-pipes P, which will permit the water in said body to rise about said exhaust nearly to its top, but, however, discharging before it reaches a height sufficient to overflow into said exhaust.

P' is a perforated partition arranged about centrally across body H, as shown, and is for the purpose of holding the filtering material F in the upper part of the purifier, leaving the lower part of the purifier for a water-reservoir.

O is a stand-pipe arranged near the purifier H, and is connected near its bottom with the water-reservoir by means of a short-pipe, T, as shown, and W is a water-pipe leading from the lower part of the reservoir to a pump which draws water to feed the boilers, (which are not necessary to be shown.)

Z is a float, and is arranged in stand-pipe O, floating on the water therein.

L is a lever pivoted about centrally to a bearing, and is arranged to connect a gate-valve, V, of supply-pipe B at one end and float Z, through the medium of rod R at its opposite end, and is for the purpose of opening and closing valve V to let on or cut off the water-supply to the heater by means of the lowering or raising of water in the stand-pipe O, which causes float Z to follow its level.

The operation in heating and purifying the water is as follows: Cold water is let into the heater through pipe B and is discharged in a spray upon plate D, and likewise falls through the perforations of plate D into the lower part of the heater. During the falling of the water, as described, the jets of exhaust-steam are acting upon the unperforated center of plate D, spreading out and passing through the side perforations of said plate, thus heating said plate very hot, and in turn heating the water-spray as it falls thereon, and as the water mingles with the jets of steam the mingled action of steam and water heats the water to a boiling-heat, or very hot, and at the same time condensing the steam, and by the thorough action of the steam heating the water. The deposits of lime, &c., held in the water are precipitated, and when conducted to the purifier are filtered and separated from the water by passing through a deposit of wood shavings, forming the filtering material, and which receives the lime deposit and permits the water to pass onto the reservoir below in a purified condition.

The heater A is provided with a man-hole for entering, if necessary, to repair and remove precipitated substances, and also the body H is provided with a man-hole for placing in a supply of filtering material and for removing the same after it is filled with the deposits from the water.

By means of the stand-pipe O and float Z and its connection with the valve V of the water-supply pipe B the water-supply is regulated automatically as water is required for use.

J is an outlet for permitting escape of steam that may enter the filter with the hot water.

Having thus described my invention, what I claim as new, and desire to secure by Letters Patent, is as follows, to wit:

1. In the feed-water heating and purifying apparatus described, the heater A, having arranged therein at or near its lower part a pipe connecting the exhaust of a steam-engine and a series of short vertical exhaust-pipes arranged in the upper part of said pipe, a plate arranged longitudinally above said vertical exhausts and perforated, as set forth, and a perforated cold-water-supply pipe arranged longitudinally above said plate in such manner as to discharge a water-spray upon said plate, whereby the steam exhausts against said plate, mingles with and heats the water, and condenses, in the manner substantially as and for the purpose specified.

2. The feed-water heater and purifier described, consisting of a horizontal body, A, having arranged therein the steam-exhausts S P, perforated plate D above said exhausts, and perforated feed-pipe B above said plate, in combination with a filter arranged below said body and connected therewith by means of a pipe and having a deposit of wood shavings through which the water filters, a receiving-reservoir, and a discharge-pipe, substantially as and for the purpose specified.

3. In combination with the heater A, the inlet steam-pipe S, having the vertically-arranged exhaust-pipes P, the perforated plate D, having the sides D', the perforated cold-water-inlet pipe B, the filter H, connected with and below said heater by means of a pipe, F, and having a receptacle for filtering material and for holding filtered water, and the means shown and described for automatically regulating the cold-water supply, substantially as and for the purpose set forth.

JAMES MILLER.

Witnesses:
 THOS. H. HUTCHINS,
 WM. J. HUTCHINS.